United States Patent [19]

Tokuno et al.

[11] Patent Number: 4,798,110

[45] Date of Patent: Jan. 17, 1989

[54] METHOD FOR POSITIONING TOOLS

[75] Inventors: Masateru Tokuno, Hyogo; Tetsuya Sawata, Kyoto; Yasuharu Mori, Hyogo, all of Japan

[73] Assignee: Rengo Co., Ltd., Osaka, Japan

[21] Appl. No.: 318,042

[22] Filed: Nov. 4, 1981

[30] Foreign Application Priority Data

Nov. 13, 1980 [JP] Japan ................................ 55-160317
Feb. 24, 1981 [JP] Japan ................................ 56-27377
Sep. 1, 1981 [JP] Japan ................................ 56-138095

[51] Int. Cl.[4] ........................ B26D 7/26; G05B 19/28; B23D 19/06

[52] U.S. Cl. ........................................... 83/13; 83/56; 83/425.4; 83/558.3; 83/498

[58] Field of Search ....................... 83/499, 498, 425.4, 83/56, 71, 13, 504; 318/603.4

[56] References Cited

U.S. PATENT DOCUMENTS

| | | | |
|---|---|---|---|
| 3,646,418 | 2/1972 | Stern et al. | 83/549 X |
| 3,742,796 | 7/1973 | McMillan | 83/425.4 X |
| 3,750,513 | 8/1973 | Cromeens | 83/425.4 |
| 4,224,847 | 9/1980 | Tokuno | 83/71 |

*Primary Examiner*—Donald R. Schran
*Attorney, Agent, or Firm*—Robert B. Frailey

[57] ABSTRACT

A method for positioning tools comprises a first process for moving all tools into a stand-by reach and a second process for moving tools into a positioning reach, and the second process comprises steps of moving a tool onto an origin and moving the tool from the origin by a distance equal to a desired distance between the tool and a following tool. An apparatus for positioning tools is provided with a single signal generator rotated by a rotating shaft for moving shifters, by which the tools are moved in the positioning and stand-by reaches.

11 Claims, 4 Drawing Sheets

METHOD FOR POSITIONING TOOLS

This invention relates to method and apparatus for positioning a plurality of tools or pairs of tools slidably mounted on a carrier shaft or a pair of carrier shafts along the carrier shaft or shafts onto respective desired positions.

As to conventional apparatuses performing this kind of method for positioning tools, there is known an apparatus which is used in slitter-scorer apparatuses for manufacturing corrugated boards which repositions slitting and scoring tools in accordance with the pattern of a corrugated board to be manufactured in a subsequent performance. That invention is not limited to use in slitter-scorer apparatuses but is applicable to machines for processing paper, cloth, plastic film and sheet, and thin metallic sheet. However, the following descriptions are given in connection with the slitter-scorer apparatuses.

U.S. Pat. No. 3,646,418 discloses a method and an apparatus for positioning slitting and scoring tools in a conventional slitter-scorer apparatus.

The apparatus for positioning slitting and scoring tools according to the U.S. patent aforesaid has been commonly used for four slitter-scorer units, and accordingly the apparatus has parts necessary for this purpose. The apparatus for positioning the slitting and scoring tools for one of the four slitter-scorer units is provided with shifters equal to the total number of the pairs of slitting and scoring tools of the unit, each shifter being capable of engaging and disengaging with a pair of slitting and scoring tools. The apparatus is also provided with a rotatable shaft, which is a driven screw, for moving the multiple shifters. Each shifter is controlled so that the shifter may or may not be moved when the rotatable shaft is rotated, and the pairs of tools are simultaneously moved by means of the shifters along a pair of carrier shafts respectively when the tools are to be moved in the same direction, and then positioned at desired positions.

Since each shifter is provided with a signal generator for communicating its actual location to a control system, the control system can compare signals from each shifter signal generator with signals corresponding to the actual location of a pair of tools with which the shifter is to be engaged, or with signals corresponding to a desired location of a pair of tools with which the shifter has been engaged, and command each shifter to move or not to move in accordance with the rotation of the rotatable shaft. Accordingly, the multiple shifters may be simultaneously moved when the shifters are to be moved in the same direction.

In the control system, the signals corresponding to actual locations of tools, from which associated shifters have been disengaged, and the signals which have been communicated to the control system for the actual locations of the shifters, when the tools have been disengaged from the shifters, are registered.

The actual location of each tool and shifter is counted as the distance from an origin which each tool and shifter pass when they are moved from one of two stand-by reaches located adjacent opposite ends of the carrier shafts to a positioning reach extending over the middle portions of the carrier shafts.

A disadvantage of the method for positioning tools according to the U.S. patent aforesaid is that signals corresponding to an actual location of a tool or shifter are generated according to the distance over which the shifter has moved after it has passed the origin. Of course, a distance over which the shifter is moved in the opposite direction is counted as a negative distance. Accordingly, owing to the inaccuracy of the mechanism of the apparatus, unavoidable errors originate between the actual location of the shifter and the location corresponding to the signals generated by the signal generator for the shifter, and the errors grow large in proportion to the total distance over which the shifter has been moved and the frequency of the movement of the shifter. In order to eliminate the errors, it is necessary to move the shifters into the stand-by reach so that the erroneous data registered in the control system may be cancelled.

A second disadvantage, is that each shifter is provided with its own signal generator, and accordingly there are many kinds of signals and the control system is complicated.

A first object of the present invention is to provide a method for positioning tools, wherein the disadvantages of the before-mentioned method are solved and the tools are positioned accurately.

A second object of the present invention is to provide an apparatus for positioning tools, wherein the disadvantages of the before-mentioned apparatus are solved and the control system is simplified.

Further objects of the invention will become apparent from the description given below presented in connection with the accompanying drawings.

The preferred method and apparatus for positioning tools according to the present invention are illustrated in connection with the annexed drawings.

Before describing the method, brief explanation as to the apparatus will be given below, making reference to FIG. 1.

Figure 1:
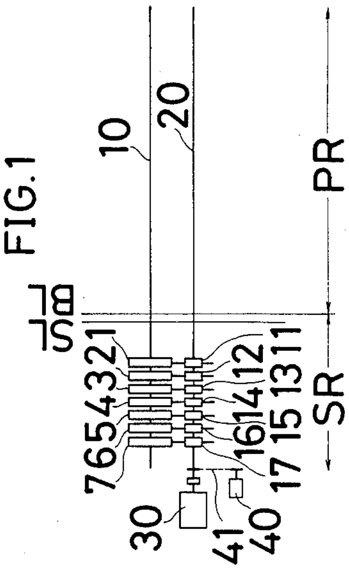
FIG. 1 is a dragrammatic view of the apparatus according to the invention and aims to make easy the explanation of the method according to the invention.

As shown in FIG. 1, one reach extending from the right side of a border line (abbreviated BL in the drawings) drawn approximately at the middle is called a positioning reach (abbreviated PR in the drawings), in which tools are to be positioned, and the other reach extending from the left side of the border line is called a stand-by reach (abbreviated SR in the drawings), in which the tools are to stand by. An origin, which is a standard point for positioning the tools, is arranged on the border line.

Reference numbers from 1 to 7 indicate first, second, third, fourth, fifth, sixth and seventh tools respectively, and reference number 10 indicates a carrier shaft. The tools 1 to 7 are slidably mounted on the carrier shaft 10.

Reference numbers from 11 to 17 indicate first, second, third, fourth, fifth, sixth and seventh shifters. The shifters 11 to 17 are shown as engaged with the tools 1 to 7 respectively. Reference number 20 indicates a rotatable shaft for moving the shifters from 11 to 17.

Figure 6:
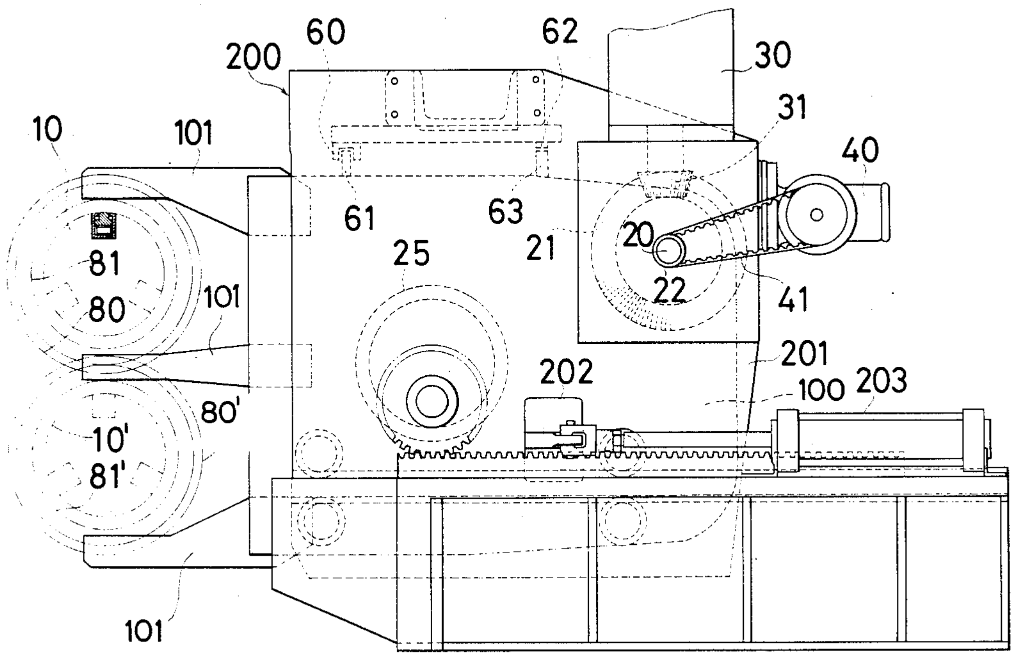
FIG. 6 is a side view in elevation of the embodiment of FIG. 5.

At an end of the rotatable shaft, a motor 30 is connected to drive the rotatable shaft, and a signal generator 40 is connected to generate signals synchronously with the rotation of the rotatable shaft or the motor. The signal generator is driven by means of a transmitting belt 41 (FIG. 6). The motor is capable of changing speeds between a high speed and a low speed and changing directions of the rotation from a normal direction to a reverse direction and vice versa. Further, controlled or selected rotation of the rotatable shaft 20 is communicated to a control system (FIG. 8) by means of signals generated by the signal generator.

The shifters 11 to 17 are provided respectively with a cluth device 70 (FIG. 7) so that they may or may not be moved respectively when the shaft 20 is rotated. Accordingly, where the shifters 11 to 17 are to be moved in accordance with the rotation of the shaft 20, and the shaft 20 is rotated in the normal direction, the tools 1 to 7 are moved together with the shifters 11 to 17 along the carrier shaft 10 in the direction from the stand-by reach toward the positioning reach, crossing over the origin located at the border line.

Now, the method according to the invention comprises a first process for moving all the tools into the stand-by reach by means of their associated shifters and a second process for moving a selected or desired number of tools from the stand-by reach into the positioning reach by means of their associated shifters.

Following description is made with reference to two examples of the method according to the invention.

Figure 3:
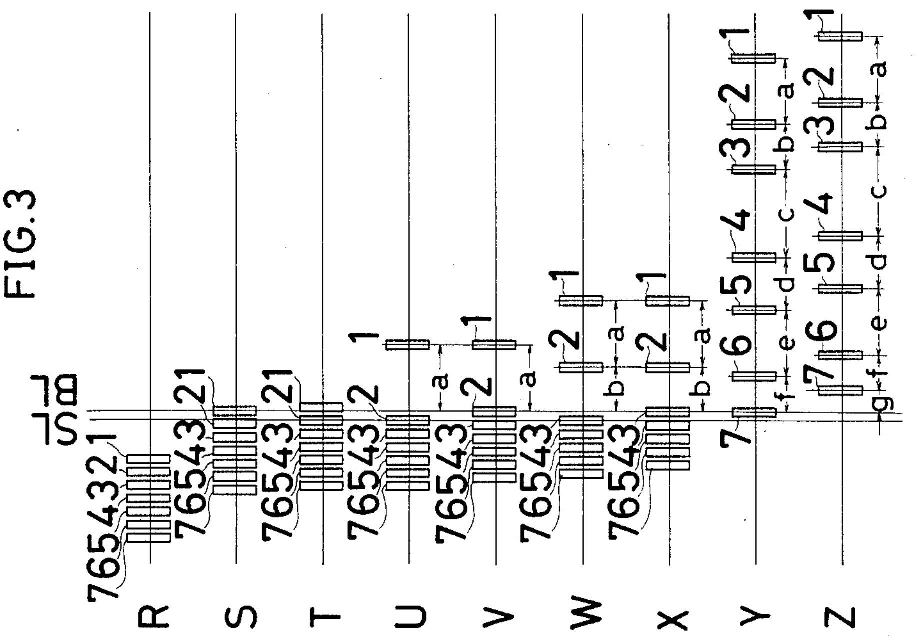
FIG. 3 is a diagram of a second process of the first example.

In the first example, seven tools, which are all the tools in this case, will be positioned. As a matter of convenience for explanation, the second process will be explained first. Reference is made to FIG. 3 of the drawings.

First, the motor 30 is started at a high speed in the normal direction of rotation, and the shaft 20 is rotated at a high speed in the normal direction of rotation. Then, the tools 1 to 7, which have been moved into the stand-by reach, as shown at R of FIG. 3, are moved at a high speed toward the origin. In a short time, when the tool 1 reaches a stop line (abbreviated SL in the drawings), the motor is changed so as to rotate at a low speed, and accordingly the tools 1 to 7 are moved at a low speed. Then, the tools 1 to 7 are stopped by stopping of the motor when the tool 1 reaches the origin, as shown at S of FIG. 3. After the tool 1 has reached the origin and the motor has been stopped, the motor is changed so as to rotate at the high speed and the control system is switched over so that it may count signals coming from the signal generator.

Subsequently, when the motor is started again at the high speed, the tool 1 is moved into the positioning reach, while the tools 2 to 7 are moved in the stand-by reach. As shown at T of FIG. 3, when the tool 2 reaches the stop line, the tools are stopped in accordance with the stopping of the shifters 12 to 17 owing to disengagement of each of the clutch devices 70 of the shifters, while the tool 1 still is being moved. As shown at U of FIG. 3, when the tool 1 is moved from the origin BL by a desired distance (a), the control system, which has counted signals corresponding to the desired distance, commands the motor to stop, and accordingly the motor is stopped. The stoppage of the motor is carried out after the motor has been changed so as to rotate at the low speed when the tool 1 has been moved by a distance a little less than the desired distance (a). Since the distance between the stop line and the origin is short, the tool 2 can reach the stop line before the tool 1 is moved by the desired distance (a), in other words, the tool 2 can reach the stop line, while the motor is rotated.

While the motor is stopped, it is changed so as to rotate at the low speed, and the shifter 11 is changed so as not to be moved in accordance with the rotation of the rotatable shaft 20 or the motor 30, while the shifters 12 to 17 are changed so as to be moved. In addition, the control system is changed so as not to count the signals from the signal generator. Subsequently, the motor is started at the low speed, and accordingly the tools 2 to 7 are moved at the low speed, while the tool 1 is not moved. As shown at V of FIG. 3, when the tool 2 reaches the origin, the motor is stopped, and accordingly the tools 2 to 7 are stopped. Since the tool 2 is located at the origin, the distance between the tool 1 and the tool 2 becomes equal to the desired distance (a). During the stand-still of the motor, the shifters 11 to 17 are changed so as to be moved, and the control system is changed so as to count signals.

Subsequently, the motor is rotated at the high speed, and accordingly the tools 1 and 2 are moved in the positioning reach, while the tools 3 to 7 are moved in the stand-by reach. The tools 1 and 2 are moved while keeping the distance (a) between them. As shown at W of FIG. 3, when the tool 2 is moved from the origin by a desired distance (b), the motor is stopped under the command of the control system, which has received signals corresponding to the desired distance (b), and accordingly the tools 1 and 2 are stopped. The stop of the motor is carried out, after the motor has been changed so as to rotate at the low speed, in the same manner as explained relating to U of FIG. 3. On the other hand, when the tool 3 reaches the stop line, the shifters 13 to 17 are changed so as not to be moved in accordance with the rotation of the motor, and accordingly the tools 3 to 7 are stopped in the same manner as explained relating to U of FIG. 3.

While the motor is stopped, it is changed so as to rotate at the low speed, and the shifters 11 and 12 are changed so as not to be moved in accordance with the rotation of the motor, while the shifters 13 to 17 are changed so as to be moved. Also, the control system is changed so as not to count signals. Subsequently, the motor is started at the low speed, and accordingly the tools 3 to 7 are moved at the low speed. The tools 3 to 7 are stopped, as shown at X of FIG. 3, by stopping the motor 30 when the tool 3 reaches the origin. The distance between the tool 2 and the tool 3 becomes equal to the desired distance (b) when the tool 3 reaches the origin.

In the same manner as shown at Y of FIG. 3, the distance between the tool 3 and the tool 4, the distance between the tool 4 and the tool 5, the distance between the tool 5 and the tool 6, and the distance between the tool 6 and the tool 7 are set respectively to the selected or desired distances (c), (d), (e) and (f). Subsequently, as shown at Z of FIG. 3, the tools 1 to 7 are moved, and then stopped in accordance with the stop of the motor, when the tool 7 is moved by a desired distance (g) from the origin BL.

As described above, the desired number of tools are positioned along the carrier shaft, each of the tools being spaced by the desired distance between each other.

Next, a first process, that is to say, a process for moving tools from the positioning reach into the stand-by reach will be explained. In the first process, tools which were positioned during a former operation in the positioning reach are to be moved into the stand-by reach.

Figure 2:
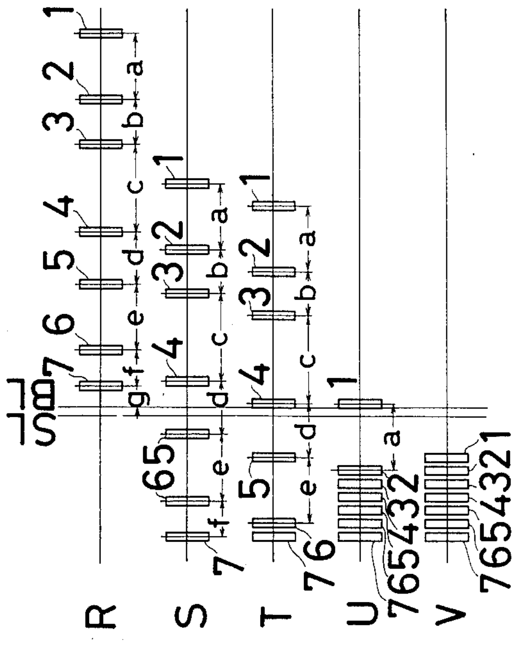
FIG. 2 is a diagram of a first process of a first example of the method according to the invention.

At R of FIG. 2, the locations of the tools 1 to 7 are shown after the second process has been completed. Accordingly, the locations are same as the locations shown at Z of FIG. 3. First, the shifters 11 to 17 are changed so as to be moved in accordance with the rotation of the motor, and the motor is started so as to rotate at a high speed in the reverse direction. Accordingly, the tools 1 to 7 are moved toward the stand-by reach while maintaining the selected distances between each other. As shown at S of FIG. 2, when the tool 7 reaches its stand-by position, the shifter 17 is changed so as not to be moved in accordance with the rotation of the motor and it is stopped. Similarly, as shown at T of FIG. 2, when the tool 6 reaches its stand-by position, the shifter 16 is changed so as not to be moved in accordance with the rotation of the motor. At U of FIG. 2, a situation is shown at the time when the tool 2 reaches its stand-by position, and at V of FIG. 2, the situation is shown at the time when tool 1 reaches its stand-by position. Thereupon, the motor is stopped and the first process is completed.

A second example of the method according to the invention now will be explained making reference to FIGS. 2 and 4.

The first process of the second example for moving tools from the positioning reach into the stand-by reach is the same as the first process explained in the first example (FIG. 2).

As shown at R of FIG. 2, the tools 1 to 7 are in the positioning reach. When the motor is started at a high speed in the reverse direction, the tools 1 to 7 are moved simultaneously toward the stand-by reach by means of the shifters 11 to 17. The shifters 11 to 17 are changed so as not to be moved with the rotation of the motor and accordingly the shifters are stopped, when they reach their respective stand-by positions. Finally, the motor is stopped. The situation at the time when the motor is stopped is shown at V of FIG. 2.

The second process of the second example will be explained making reference to FIG. 4.

Figure 4:
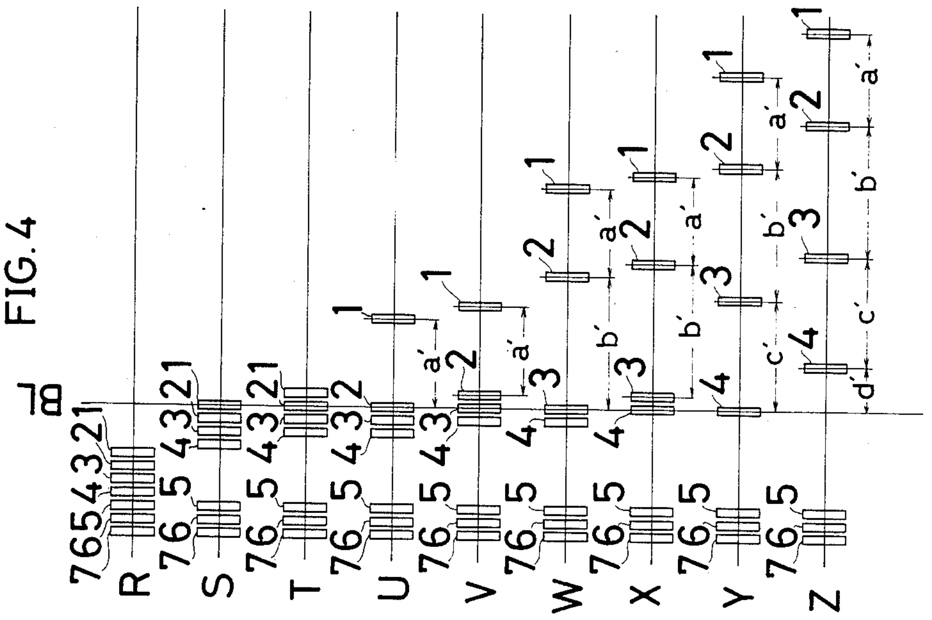
FIG. 4 is a diagram of a second process of a second example of the method according to the invention.

As shown in FIG. 4, four tools are to be positioned in the second example. Referring to R of FIG. 4, shifters 11 to 14 corresponding to the tools 1 to 4 are changed so as to be moved in accordance with the rotation of the motor, while shifters 15 to 17 corresponding to the tools 5 to 7 are maintained so as not to be moved in accordance with the rotation of the motor. The motor is started at a high speed in the normal direction of rotation, and accordingly the tools 1 to 4 are moved toward the origin at a high speed. When the tool 1 reaches a position a little short of the origin, the motor is changed so as to rotate at a low speed. And then, as shown at S of FIG. 4, when the tool 1 reaches the origin, the motor is stopped. Of course, the tools 5 to 7 are not moved and remain at their stand-by positions.

After the control system is changed so as to count signals generated by the signal generator, the motor is started at the high speed, and accordingly the tools 1 to 4 are moved at the high speed. When the tool 2 reaches a position a little short of the origin, the motor is changed so as to rotate at a low speed. Subsequently when the tool 2 reaches the origin as shown at T of FIG. 4, the motor is stopped and accordingly the tools 1 to 4 are stopped.

Thereupon, the shifters 12 to 14 corresponding to the tools 2 to 4 are changed so as not to be moved in accordance with the rotation of the motor. When the motor is started at the high speed, the tool 1 is moved alone at the high speed into the positioning reach. As shown at U of FIG. 4, when the tool 1 is moved from the origin by a distance equal to a desired distance (a') between the tool 1 and the tool 2, the motor is stopped owing to a command from the control system which has received signals corresponding to the desired distance. The stop of the motor is carried out, after the motor has been changed so as to rotate at the low speed when the tool 1 has been moved by a distance a little less than the desired distance (a').

Subsequently, the shifters 12 to 14 corresponding to the tools 2 to 4 are changed so as to be moved in accordance with the rotation of the motor, and the control system is changed so as to newly count signals generated by the signal generator. When the motor is started at the high speed, the tools 1 to 4 are moved, and then when the tool 3 reaches a position a little short of the origin, the motor is changed so as to rotate at the low speed. As shown at V of FIG. 4, when the tool 3 reaches the origin, the motor is stopped, and accordingly the tools 1 to 4 are stopped. Since each distance between the four tools is maintained, the distance between the tool 1 and tool 2 remains equal to the desired distance (a').

Subsequently, the shifters 13 and 14 corresponding to the tools 3 and 4 are changed so as not to be moved in accordance with the rotation of motor, and the motor is started at the high speed, and accordingly the tools 1 and 2 are moved. The motor is changed so as to rotate at the low speed after the tool 2 is moved from the origin, that is from the tool 3 now located at the origin, by a distance a little less than a desired distance (b') between the tool 2 and the tool 3. As shown at W of FIG. 4, when the tool 2 is moved from the origin by a distance equal to the desired distance (b'), the motor is stopped, and accordingly the tools 1 and 2 are stopped.

In the same manner, as shown at X of FIG. 4, the tools 1 to 4 are moved keeping positional relationships between each other, until the tool 4 is moved to the origin. Subsequently, as shown at Y of FIG. 4, the tools 1 to 3 are moved until the tool 3 is moved from the tool 4 located at the origin by a distance equal to a desired distance (c'). At last, as shown at Z of FIG. 4, the tools 1 to 4 are moved until the tool 4 is moved from the origin by a distance equal to a desired distance (d'). Accordingly, the four tools are finally positioned.

As explained in the above-mentioned two examples, in the method for positioning tools according to the present invention, the tools are moved from the positioning reach into the stand-by reach, and then, the tools are moved from the stand-by reach into the positioning reach passing the origin on the way. As explained in the first example, after a tool nearest to the origin among tools located in the stand-by reach has been moved to the origin, that tool is moved into the positioning reach by a selection distance equal to a desired distance between that tool and a following tool in the stand-by reach. In case some tools have been already moved into the positioning reach, the tool located in the origin and the tools located at the positioning reach are moved together maintaining the desired distances between them. Or as explained in the second example, after a tool nearest to the origin among tools located in the stand-by reach has been moved to the origin, that tool and a following tool located in the stand-by reach are moved toward the positioning reach until the following tool reaches the origin and remains there. Subsequently, the former tool is moved by a distance equal to a desired distance between the former tool and the following tool. In case some tools have been already moved into the positioning reach, those tools and the former tool are moved together maintaining the selected distances between each other.

In the method according to the invention, each of a desired number of tools is positioned respectively in turn so that each tool may have a desired distance between itself and the tool following after it. At last all the selected tools are moved by a distance equal to a desired distance between the last tool and the origin, while the distances between the tools are maintained. Thus all the steps for positioning the desired number of tools are finished. Accordingly, countings of the signals generated by the signal generator are carried out only when each tool is moved from the origin by a distance equal to the desired distance between that tool and the following tool or the origin.

Accordingly, accumulation of errors such as occurs in the prior art never occurs in the method according to the invention. Also, the control system is extremely simple as compared with the control system of the prior art because there is only one kind of signal generated by the signal generator.

In the examples, the motor is stopped after it has been changed so as to rotate at a low speed. However, this is not an indispensable step but a preferable step. Further, in the examples, the motor is stopped when the tool nearest to the origin among the tools located in the stand-by reach has been moved to the origin, and when a tool has been moved from the origin by a distance equal to a desired distance between that tool and a following tool. However, the examples may be carried out so that the shifters corresponding to the tools are not moved while the motor is rotated, in other words, by stopping the shifters without stopping the motor. Thus, the stop of the motor is not an indispensable but a preferable step, also.

Next, an embodiment of an apparatus according to the present invention, said embodiment being provided with seven shifters, will be explained making reference to FIGS. 5 to 8 of the drawings.

Principle structure of the embodiment has been already explained relating to the examples of the method.

In the apparatus according to the invention, the origin (FIG. 5) which is a standard position for positioning tools 1 to 7 along the carrier shaft 10 and positioning shifters 11 to 17 along the rotatable shaft 20 is located at a border line BL between a positioning reach PR in which the tools 1 to 7 are to be positioned, and a stand-by reach SR located only at one side of the positioning reach into which all the tools are moved out of the positioning reach. A detector 60 for indicating the origin is arranged at the border line, while each shifter is provided with a corresponding detectable piece 61 (FIGS. 6, 7), whereby each detectable piece 61 is opposed to the detector 60 when it passes the origin. Also, detectors 62 for indicating tool stand-by positions are arranged respectively in the stand-by reach where the tools 1 to 7 stand by together with their associated shifters, while each shifter is provided with a detectable piece 63 (FIGS. 6, 7) for its stand-by position, each detectable piece 63 being opposed to a detector 62 in the stand-by reach.

The above-mentioned detector 60 and detectable pieces 61, and the detectors 62 and detectable pieces 63 are correspondingly installed. Accordingly, if desired, a detector may be installed in place of the detectable piece while a detectable piece may be installed in place of the detector.

Further, the stop line SL is arranged parallel to the border line in the stand-by reach adjacent to the border line, and a detector 64 for indicating the stop line is installed on the line. However, the stop line may not be arranged.

Figure 8:
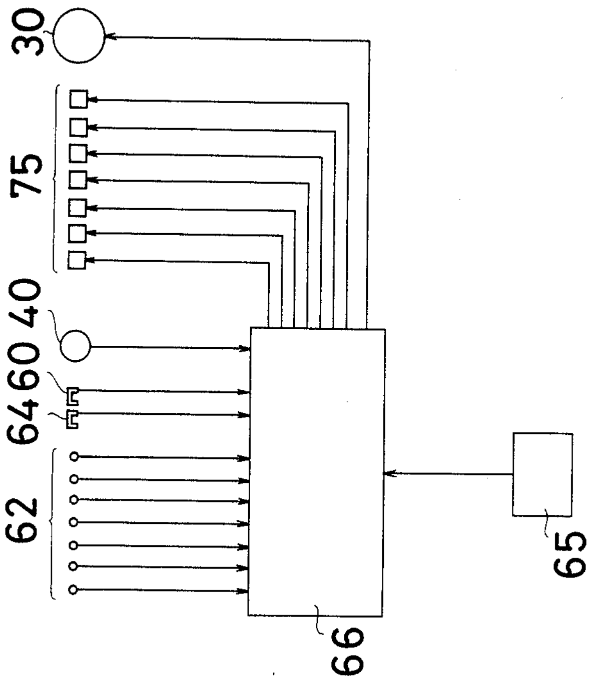
FIG. 8 is a diagram of a control system of the embodiment.

As shown in FIG. 8, a control system of the apparatus according to the invention comprises the signal generator 40, the detector 60 for indicating the origin, the detectable pieces 61 for the origin (See FIG. 6), the detectors 62 for indicating the stand-by positions, the detectable pieces 63 for the stand-by positions (See FIG. 6), and the detector 64 for indicating the stop line as explained so far. The control system further comprises a card reader 65 and control arrangements 66.

The card reader reads data as to tool positions from cards on which the data have been recorded and puts the data into the control arrangements. The control arrangements command the motor 30 so as to start or stop, so as to rotate in either of the normal or reverse directions and at either of the low and high speeds, in accordance with the data, the signals from the detectors 60 and 62, and the signals from the signal generator 40. The control arrangements also command the magnetic valve 750 (FIG. 7) of each clutch device 70 of each of the shifters 11 to 17 so that the shifter may or may not be moved in accordance with the rotation of the rotatable shaft 20. Further, the control arrangements do or do not count the signals from signal generator in conformity with the data and the signals from the detector 60 for indicating the origin.

Figure 5:
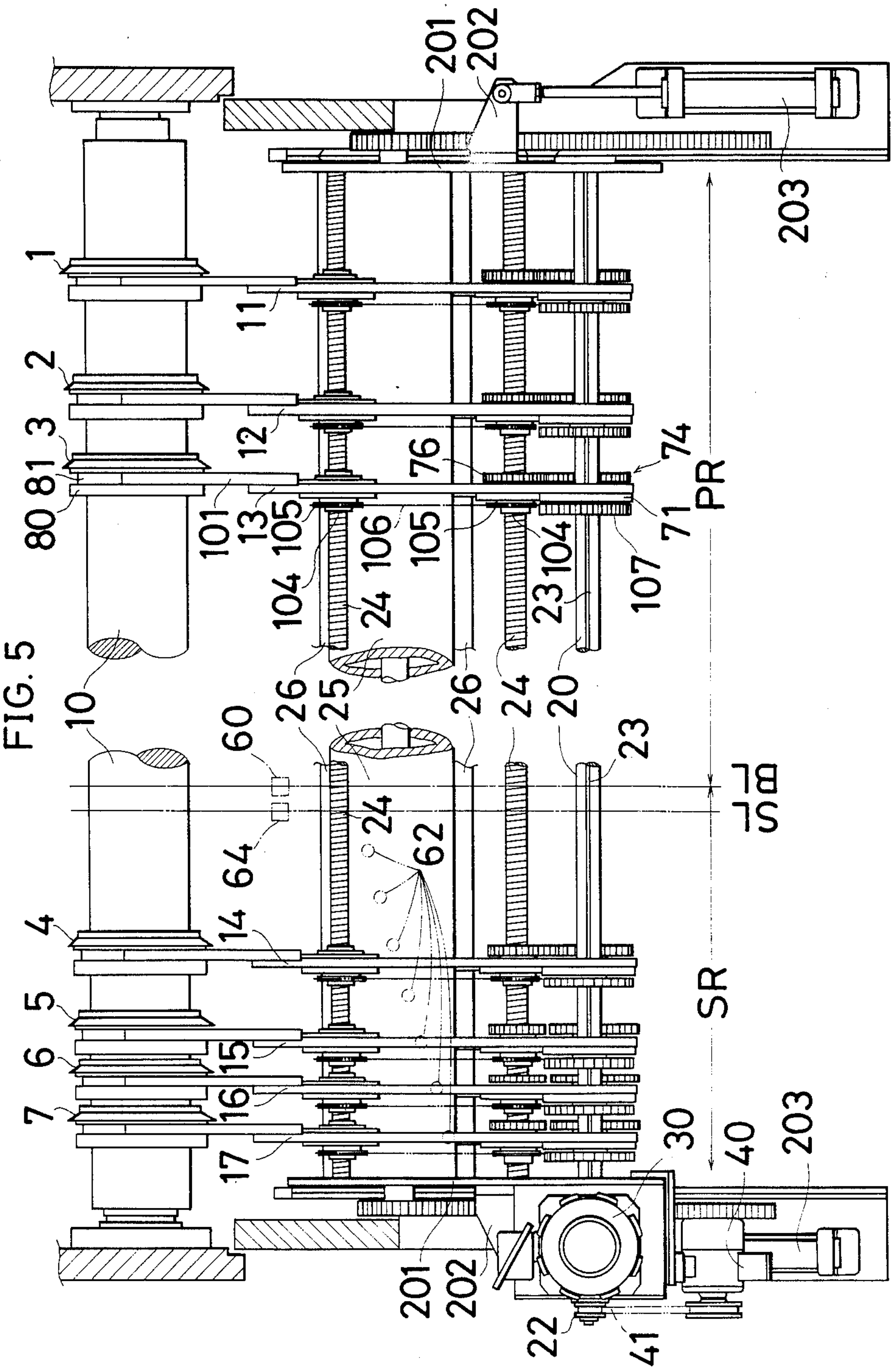
FIG. 5 is a fragmentary view in plan of an embodiment of the apparatus according to the invention.
Figure 7:
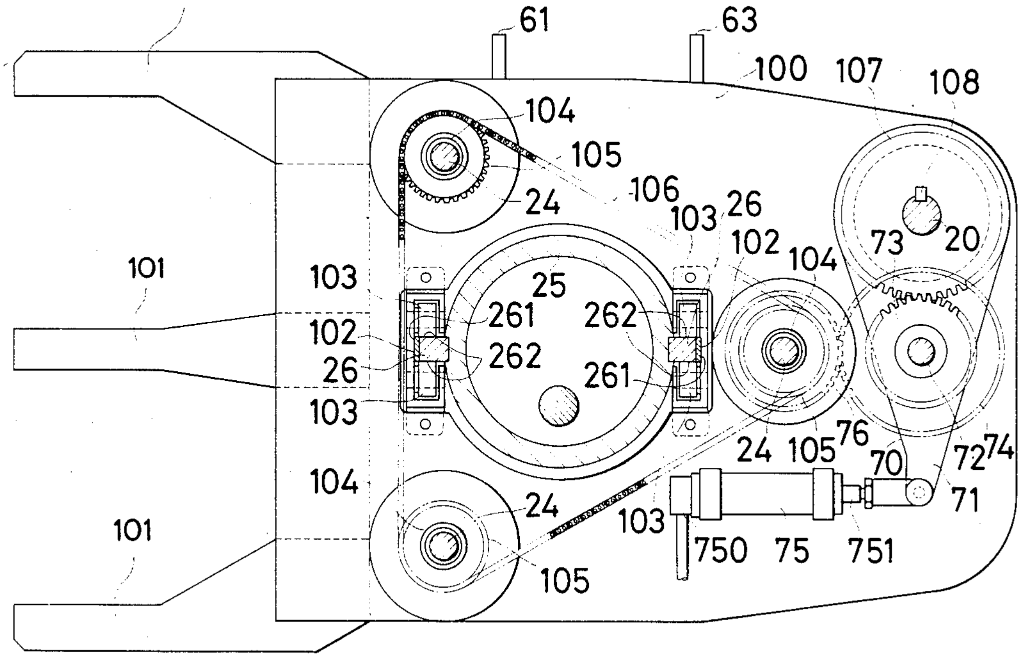
FIG. 7 is an enlarged side view in section of a shifter of the embodiment of FIG. 5.

Now, the preferred mechanical structure of the embodiment will be explained with reference to FIGS. 5 to 7.

The rotatable shaft 20 is mounted on a retractable carrage 200 (FIG. 6) and is arranged parallel to the carrier shaft 10. Both ends of the shaft 20 are rotatably supported on side plates 201 of the carrage 200. At an end portion which extends out from one side plate 201, the rotatable shaft 20 is provided with a bevel gear 21 for engaging with a bevel gear 31 attached to the shaft of a motor 30 and with a pulley 22 for a transmitting belt 41 for driving the signal generator 40. Further, the rotatable shaft 20 is provided with a key way 23 which runs the full length of the shaft between the spaced side plates 201.

The before-mentioned motor 30 is a direct current motor commonly used and capable of rotating in an ordinary direction and a reverse direction, and capable of rotating at a high speed and at a low speed. The motor 30 and the signal generator 40 are mounted on one of the side plates 201.

On the carrage 200 are mounted three elongated fixed screws 24 and an elongated beam 25 in a shape of tube. They are arranged parallel to the rotatable shaft 20 and their ends are respectively fixed on the pair of the side plates 201. Each of the three fixed screws is indentical with each other and provided with a continuous thread between the spaced side plates 201. The tubular beam 25 is provided with a pair of rails 26 which have respectively a vertical surface 261 (FIG. 7) and upper and lower horizontal surfaces 262 parallel to the carrier shaft 10.

Each of the seven shifters 11 to 17 has an identical structure and is provided with a shifter body 100, a plate 101 fixed to the shifter body 100, a pair of sliding faces 102, two pairs of rollers 103, three rotatable nuts 104, a driving gear 107, clutch means 70, a detectable piece 61 for the origin and a detectable piece 63 for the stand-by position.

Each plate 101 is so shaped that it may engage with a circumferential groove 81 formed in a holder 80 of each tool. Each sliding face of the pair of sliding faces 102 is so arranged that it may come in contact with one of the vertical faces 261 of the pair of rails 26. Each pair of rollers of the two pairs of rollers 103 are so arranged that the pair of rollers may come in contact with the upper and lower horizontal surfaces 262 of the rails 26 respectively. Each of the rotatable nuts 104 is rotatably mounted on the shifter body 100 and so arranged that it may be threadedly engaged with one of the fixed screws 24. Each rotatable nut 104 is provided with a sprocket 105 fixed concentrically on it, and a chain 106 is entrained around the three sprockets 105.

A driving gear 107 is mounted rotatably on one side face of each shifter body 100 and is slidably mounted on the rotatable shaft 20. Each gear 107 is provided with a key 108 for engaging within the key way 23 of the rotatable shaft 20.

Each clutch means 70 comprises a lever 71 pivotably suspended from the bearing case of the driving gear 107, an intermediate shaft 72 extending through the lever 71 so as to be rotatably supported there, an intermediate gear 73 fixed at one end of the intermediate shaft 72, said intermediate gear 73 being engaged with the driving-gear 107, a clutch gear 74 fixed at the other end of the intermediate shaft 72, an air-cylinder 75 fixed on the shifter body 100, a rod 751 of said air-cylinder 75 being pivotably connected to the lower end of the lever 71, and a driven gear 76 capable of being engaged with the clutch gear 74, said driven gear being fixed on one of the rotatable nuts 104 together with the sprocket 105. The air-cylinder is provided with the magnetic valve 750.

The retractable carrage 200 is operable to simultaneously engage the plates 101 of the shifters 11 to 17 with the circumferential grooves 81 of the holders of the tools 1 to 7 and to simultaneously disengage the plates from the circumferential grooves. It is provided with a pair of air-cylinder 203, the rods of which are connected to projections 202 on the pair of side plates 201, whereby the carrage can be moved back and forth. However, further explanation as to the carrage 200 is omitted, because the carrage is not necessary to the present invention.

The apparatus according to the invention may in an apparatus which is not provided with a carrage and in which parts are fixedly installed which correspond to the before-mentioned parts installed on the carrage 200. Further, the before-mentioned U.S. patent and U.S. Pat. No. 4,224,847, the inventor of which is one of the inventors of this invention, disclose carrages similar to the carrage of the embodiment of FIGS. 5–7. Accordingly, further explanation as to the carrage is omitted.

Another particular characteristic of the invention is that each shifter is provided with plural rotatable nuts, which are threadedly engaged with plural fixed screws respectively, and the nuts are rotated to move the shifter. The power for rotating the nuts is communicated from a single rotatable shaft 20. In the embodiment described, each shifter is capable of being smoothly moved at a high speed owing to this characteristic of the invention.

In the apparatus according to the present invention, the plurality of shifters are not each provided with a separate signal generator. Instead, the rotatable shaft for moving the plurality of shifters is controlled by one signal generator. Accordingly, the control system is simple and the apparatus can position the tools or pairs of tools precisely.

The invention is especially useful in slitter-scorer apparatus having one or more slitter-scorer units for manufacturing corrugated paperboard. As illustrated in FIG. 6, the tools 1 to 7 may comprise several pairs of conventional, vertically aligned, rotatable slitter rolls and scorer rolls. The upper roll of each pair of rolls is mounted slidably on upper carrier shaft 10, and the lower roll of each pair of rolls is mounted slidably on a lower carrier shaft 10'. Each shifter 11 to 17 may be provided with three roll shifting plates 101, 101' and 101''. Upper plate 101 and intermediate plate 101' engage within the circumferential groove 81 formed in the holder 80 for an upper roll or tool of a pair of rolls or tools, while lower plate 101'' and the intermediate plate 101' engage within the circumferential groove 81' formed in the holder 80' for the lower roll or tool of the pair.

What is claimed is:

1. A method for positioning tools selectively in apparatus having a plurality of movable tools, a stand-by reach for storing the tools, a positioning reach in which the tools are selectively and operatively positioned and an origin located between said stand-by and positioning reaches, in which method the tools are aligned in the stand-by reach in a row extending from the origin and then a selected number of the aligned tools are advanced into the positioning reach and positioned at selectively spaced locations therein, characterized by the steps of (a) successively moving to the origin the aligned tool in the stand-by reach disposed nearest to the origin, (b) temporarily stopping the tool so moved at the origin, (c) then moving the tool which had been moved to and stopped at the origin into the positioning reach by a selected distance, (d) said selected distance being equal to a desired distance between the tool so moved from the origin and the next successive aligned tool in the stand-by reach, and (e) as each successive tool from the stand-by reach is moved from the origin into the positioning reach by its selected distance, simultaneously advancing tools previously positioned in the positioning reach by a distance equal to said selected distance by which the said successive tool is moved from the origin, whereby all tools in the positioning reach are maintained at selected distances from each other as successive tools are moved into the positioning reach.

2. The method of claim 1, wherein the tools comprise pairs of tools mounted on a pair of carrier shafts with capacity to be moved along and positioned selectively on said carrier shafts.

3. The method of claim 2, wherein the apparatus constitutes slitter-scorer apparatus for manufacturing corrugated paperboard, and the pairs of tools constitute plural pairs of slitter and scorer rolls.

4. The method of claim 1, characterized by the steps of (a) moving less than all of the aligned tools in the stand-by reach into the positioning reach, (b) moving the last tool of the selected aligned tools into the positioning reach by a selected distance equal to a desired distance between said last tool and the origin and (c) located said selected aligned tools in the positioning reach at selectively spaced locations relative to the origin and to each other.

5. The method of claim 1, characterized by the steps of (a) moving all of the aligned tools in the stand-by reach into the positioning reach, (b) moving the last tool of the aligned tools into the positioning reach by a selected distance equal to a desired distance between said last tool and the origin and (c) locating said aligned tools in the positioning reach at selectively spaced locations relative to the origin and to each other.

6. The method of claim 1, wherein the apparatus includes a control system having a single signal generator, characterized by the step of moving each tool a selected distance from the origin into the positioning reach and subsequently moving tools located in the positioning reach by additional selected distances, said tool movements being in accordance with the signals generated by the signal generator in the control system.

7. A method for positioning tools at selectively spaced locations in apparatus having a plurality of tools mounted on a carrier shaft with capacity to be moved along and positioned selectively on said carrier shaft, a stand-by reach for storing the tools, a positioning reach in which the tools are selectively and operatively positioned, an origin located between the stand-by reach and the positioning reach, a shifter for each tool for moving the tool along the carrier shaft, a rotatable shaft for moving the shifters, clutch means for engaging each shifter with the rotatable shaft to move the shifter selectively to position its tool selectively on the carrier shaft and a control system including a signal generator for controlling movements of the shifters, characterized by the steps of (a) aligning all of the tools in a row on the carrier shaft in the stand-by reach, (b) moving each tool of a selected number of the tools in the stand-by reach successively, one by one, to the origin, (c) temporarily stopping each successive tool so moved at the origin, (d) moving each tool from the origin a selected distance into the positioning reach, (e) said selected distance being equal to a desired distance between the tool so moved from the origin and the next succeeding tool on the carrier shaft in the stand-by reach, and (f) as each succeeding tool is moved from the origin into the positioning reach by its selected distance, simultaneously advancing tools previously positioned in the positioning reach by a distance equal to said selected distance by which the said succeeding tool is moved from the origin, whereby all tools in the positioning reach are maintained at selected distances from each other as successive tools are moved one by one into the positioning reach.

8. The method of claim 7, wherein the apparatus constitutes slitter-scorer apparatus for manufacturing corrugated paperboard, and the tools comprise plural pairs of slitter and scorer rolls mounted on a spaced pair of carrier shafts with capacity to be moved along and positioned selectively on said carrier shafts.

9. The method of claim 7, characterized by the step of moving the last tool of the selected number of tools into the positioning reach by a selected distance equal to a desired distance between said last tool and the origin.

10. The method of claim 7, wherein the selected tools are moved individually and successively by their shifters, characterized by the step of moving each shifter for each selected tool a selected distance from the origin into the positioning reach in accordance with signals generated by a single signal generator connected rotatably to the rotatable shaft.

11. The method of claim 7, characterized by the step of moving all of the tools aligned in the stand-by reach into the positioning reach, and locating said tools in the positioning reach at selectively spaced locations relative to the origin and to each other.

* * * * *

UNITED STATES PATENT OFFICE
CERTIFICATE OF CORRECTION

PATENT NO. : 4,798,110
DATED : January 17, 1989
INVENTOR(S) : Masateru Tokuno et al.

It is certified that error appears in the above-identified patent and that said Letters Patent is hereby corrected as shown below:

| | |
|---|---|
| Column 1, line 8 | after the period insert --The invention is particularly applicable to slitter-scorer apparatus having plural pairs of slitter rolls or tools and/or plural pairs of scorer rolls or tools for manufacturing corrugated board.-- |
| Column 1, line 33 | change "and" to --or-- |
| Column 2, line 33 | before the period insert --, where a slitter-scorer machine for manufacturing corrugated board is illustrated-- |
| Column 2, line 35 | change "dragrammatic" to --diagrammatic-- |
| Column 3, line 5 | delete "from" |
| Column 3, line 19 | change "cluth" to --clutch-- |
| Column 4, line 26 | before the period insert --(coming from the signal generator)-- |

UNITED STATES PATENT OFFICE
CERTIFICATE OF CORRECTION

PATENT NO. : 4,798,110

DATED : January 17, 1989

INVENTOR(S) : Masateru Tokuno et al.

It is certified that error appears in the above-identified patent and that said Letters Patent is hereby corrected as shown below:

| | |
|---|---|
| Column 5, line 12 | after "are" insert --the-- |
| Column 6, line 65 | change "selection" to --selected-- |
| Column 7, line 1 | change "in" to --at--; change "at" to --in-- |
| Column 8, line 46 | change "carrage" to --carriage-- |
| Column 8, line 48 | change "carrage" to --carriage-- |
| Column 8, line 63 | change "carrage" to --carriage-- |
| Column 8, line 67 | change "indentical" to --identical-- |
| Column 9, line 47 | change "carrage" to --carriage-- |
| Column 9, line 54 | change "carrage" to --carriage-- |
| Column 9, line 55 | change "carrage" to --carriage-- |
| Column 9, line 56 | change "carrage" to --carriage-- |
| Column 9, line 58 | delete "in an" and substitute --include-- |

UNITED STATES PATENT OFFICE
CERTIFICATE OF CORRECTION

PATENT NO. : 4,798,110
DATED : January 17, 1989
INVENTOR(S) : Masateru Tokuno et al.

It is certified that error appears in the above-identified patent and that said Letters Patent is hereby corrected as shown below:

| | |
|---|---|
| Column 9, line 59 | change "carrage" to --carriage-- |
| Column 9, line 64 | change "carrages" to --carriages-- |
| Column 9, line 65 | change "carrage" to --carriage-- |
| Column 9, line 66 | change "carrage" to --carriage-- |
| Column 10, line 20 | change "and" to --and/or-- |
| Column 10, line 24 | change the <u>comma</u> to a <u>period</u>; delete "101' and" |
| Column 10, line 25 | delete "101". Upper plate 101 and intermediate plate 101'" and substitute --Plates 101-- |
| Column 10, line 26 | change "groove" to --grooves-- |
| Column 10, line 27 | delete this line and substitute --holders 80.-- |
| Column 10, lines 28-31 | delete these lines |

UNITED STATES PATENT AND TRADEMARK OFFICE
CERTIFICATE OF CORRECTION

PATENT NO. : 4,798,110

DATED : January 17, 1989

INVENTOR(S) : Masateru Tokuno et al

It is certified that error appears in the above-identified patent and that said Letters Patent is hereby corrected as shown below:

Claim 4, col. 11, line 13 change "located" to --locating--.

Signed and Sealed this

Fifteenth Day of August, 1989

*Attest:*

DONALD J. QUIGG

*Attesting Officer* *Commissioner of Patents and Trademarks*